United States Patent [19]
Bell et al.

[11] 4,425,570
[45] Jan. 10, 1984

[54] REVERSIBLE RECORDING MEDIUM AND INFORMATION RECORD

[75] Inventors: Alan E. Bell; Yehuda Arie, both of East Windsor, N.J.

[73] Assignee: RCA Corporation, New York, N.Y.

[21] Appl. No.: 273,251

[22] Filed: Jun. 12, 1981

[51] Int. Cl.³ ............................................. G01D 15/34
[52] U.S. Cl. .............................. 346/135.1; 346/76 L; 365/127; 430/19; 430/945
[58] Field of Search .......................... 346/135.1, 76 L; 430/19, 945; 365/127, 120, 113

[56] References Cited

U.S. PATENT DOCUMENTS

| | | | |
|---|---|---|---|
| 3,366,480 | 1/1968 | Gaynor | 430/19 |
| 3,530,441 | 9/1970 | Ovshinsky | 340/173 |
| 3,665,483 | 5/1972 | Becker et al. | 346/1 |
| 3,716,844 | 2/1973 | Brodsky | 346/135.1 X |
| 3,761,942 | 9/1973 | Lorenz | 346/135.1 X |
| 4,010,312 | 3/1977 | Pinch et al. | 428/450 |
| 4,069,487 | 1/1978 | Kasai et al. | 346/76 L |
| 4,097,895 | 6/1978 | Spong | 358/128 |
| 4,216,501 | 8/1980 | Bell | 358/128.5 |
| 4,278,734 | 7/1981 | Ohta | 346/76 L X |
| 4,330,883 | 5/1982 | Ohta et al. | 369/100 |

FOREIGN PATENT DOCUMENTS

| | | |
|---|---|---|
| 14227 | 8/1980 | European Pat. Off. |
| 2055219 | 2/1981 | United Kingdom |
| 1592390 | 7/1981 | United Kingdom |

OTHER PUBLICATIONS

R. W. Cohen et al., Optical Properties of Granular Silver & Gold Films, Oct. 15, 1973, Physical Review B, vol. 8, No. 8, p. 3689-3701.
Bartolini et al., Review and Analysis of Optical Recording Media; Optical Engineering; vol. 15, No. 2, Mar.-/Apr., 1976, pp. 99-108.
Bartolini et al., Optical Disk Systems Emerge; IEEE Spectrum; Aug., 1978, pp. 20-28.

*Primary Examiner*—Joseph W. Hartary
*Attorney, Agent, or Firm*—Birgit E. Morris; William J. Burke

[57] ABSTRACT

The invention is a recording medium wherein the light absorptive layer is a granular material comprising domains of a light sensitive material embedded in a dielectric matrix. The domains comprise a material which can be reversibly switched from a first state to a second state having different optical properties by the absorption of light. The matrix is composed of a material which is effective for inhibiting the formation of an irreversible change in the optical properties of the absorptive layer. The invention further comprises this optical recording medium having an information track recorded therein as a series of regions in the absorptive layer wherein the domains have been reversibly switched to a second state having different optical properties.

13 Claims, 6 Drawing Figures

REVERSIBLE RECORDING MEDIUM AND INFORMATION RECORD

The United States Government has rights in this invention pursuant to a Government contract.

The invention relates to a reversible optical recording medium and information record. In particular, the optical recording medium and information record include a light absorptive layer comprising domains of a first light sensitive material embedded in a matrix.

BACKGROUND OF THE INVENTION

Information can be recorded by exposure of a portion of an optical recording medium to a recording light beam thereby changing the local optical properties of the exposed portion. The simplest such recording medium is a layer of a light absorptive material overlying a substrate wherein information is recorded by locally melting or ablating the absorptive layer to form a pit therein. The presence of the pit results in a change in the local transmission and/or the reflectivity of the recording medium, one of which is detected during readout of the information.

Spong, in U.S. Pat. No. 4,097,895, issued June 27, 1978 and entitled "MULTILAYERED OPTICAL RECORD", disclosed an optical recording medium which comprises a light reflective layer coated with a light absorptive layer, wherein the thickness of the absorptive layer is chosen so that the reflectivity of the recording medium is reduced. Bell, in U.S. Pat. No. 4,216,501 issued Aug. 5, 1980 and entitled "OPTICAL ANTIREFLECTIVE INFORMATION RECORD", has disclosed a trilayer optical recording medium having a transparent spacer layer interposed between the reflective and absorptive layers of the Spong optical recording medium. This medium permits the use of a broader class of materials and a lower reflectivity recording medium or information record than that provided by the recording medium disclosed by Spong.

Spong et al, in U.S. patent application Ser. No. 254,649 filed Apr. 16, 1981 which is a continuation-in-part of in U.S. patent application Ser. No. 174,844 filed Aug. 4, 1980 now abandoned and entitled "INFORMATION RECORD AND A METHOD OF REVERSIBLY RECORDING AND ERASING INFORMATION THEREON", which is incorporated herein by reference, have disclosed an information record in which information can be recorded, erased and re-recorded and which includes a capping layer overlying the absorptive layer. The capping layer inhibits, up to a maximum power, irreversible recording such as the formation of a pit in the absorptive layer, upon exposure to an information recording or information erasing light beam.

It would be desireable to have a recording medium in which the range of recording beam powers which produce a reversible recording is larger than that known heretofore.

SUMMARY OF THE INVENTION

An improved recording medium comprising an absorptive layer overlying a substrate which comprises one or more domains of a light absorbing material that can be reversibly switched from a first state to a second state having different optical properties embedded in a matrix of a material effective for inhibiting an irreversible change in the optical properties of the domain material.

A corresponding information record comprises the recording medium of the invention having an information track therein comprising a series of regions of the absorptive layer, each composed of one or more domains, which have been reversibly switched to a state having different optical properties, whereby the reflectivity of the information record is changed in these regions.

DETAILED DESCRIPTION OF THE INVENTION

Figure 1:
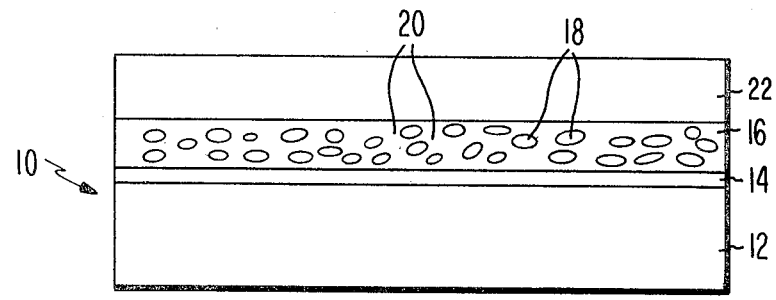
FIGS. 1-3 are cross-sectional views of a first, second and third embodiment of an optical recording medium of the invention.

Referring to FIG. 1 a reversible optical recording medium includes a substrate 12, a subbing layer 14 overlying a major surface of the substrate 12; and a light absorptive layer 16 overlying the subbing layer 14. The absorptive layer 16 is made from a granular material and is composed of domains 18 of a light absorbing material which are embedded in a matrix 20. An overcoat layer 22 overlies the absorptive layer 16.

In the FIGS. described below similar numbers are given to similar parts as are shown in FIG. 1.

Figure 2:
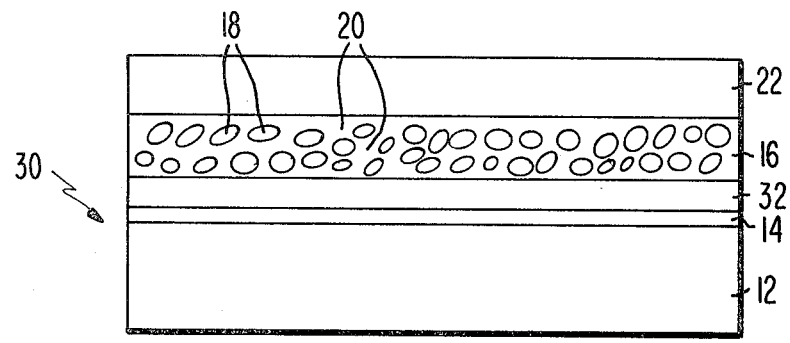

In FIG. 2 a second embodiment of a reversible optical recording medium 30 includes a light reflective layer 32 overlying the subbing layer 14.

Figure 3:
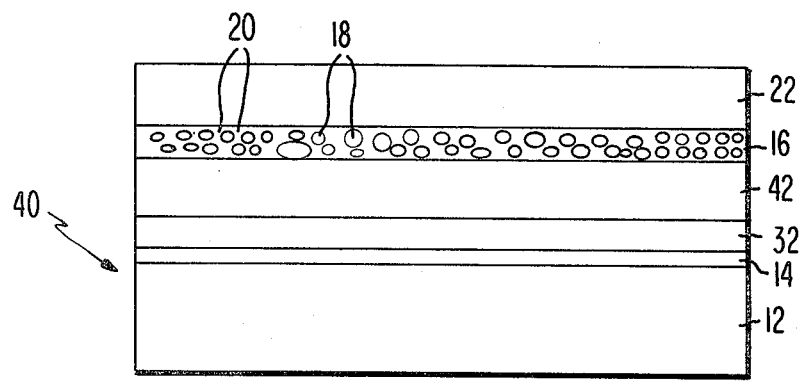

In FIG. 3 a third embodiment of a reversible optical recording medium 40 includes a spacer layer 42 overlying the reflective layer 32.

In FIGS. 1-3, the substrate 12 may be formed of glass or a plastic material such as polyvinylchloride or (poly)-methylmethacrylate, typically in the form of a disc. Alternatively, the substrate 12 may be formed of a material such as aluminum which reflects light at the recording wavelength, thus combining the functions of the substrate 12 and the light reflective layer 32 of FIGS. 2 and 3.

The subbing layer 14 has a microscopically smooth surface and is composed of a material, such as an epoxy or acrylic resin, which forms a non-conformal coating over the surface of the substrate 12.

The absorptive layer 16 of FIGS. 1-3 is composed of a granular material which is a composite of domains of a first light absorbing material such as a semiconductor or a metal, embedded in a matrix of a second material, such as a dielectric, in which it is immiscible. The optical properties of a granular material are determined by the optical properties of the materials constituting the domain and matrix and by the fractional volume concentration of the matrix occupied by the domains as discussed, for example, by Cohen et al in Physical Review B8, 3689 (1973). In our invention, the domains are composed of a material which absorbs light at the wavelength of the recording light beam and is capable of being reversibly switched from its original state to a second state having different optical properties at the readout wavelength. By reversible is meant the capability, once having been switched to the second state, of being returned to about its original state, having about the original optical properties, by exposure to an erasing light beam or by exposure to heat. Changes in the optical properties of the material constituting the domains in turn produce a change in the optical properties of the granular material of which the domains are a constituent part. The resulting change in the local optical properties of the absorptive layer produce a local change in the transmissivity or reflectivity of the recording medium. The change in the optical properties may include a change in the index of refraction, the extinction coefficient, a combination of these two, or a change in the a higher order optical constant such as the magneto-optic or electro-optic coefficients. Useful materials include tellurium, selenium or alloys containing these materials, arsenic triselenide, arsenic trisulfide and other chalcogenide alloys where absorbed light produces a change in the degree of crystallinity, and thus, of the optical properties of the domains. Alternatively, the domains may be composed of a magneto-optic material such as manganese bismuth or platinum cobalt, or an electro-optic material. In these latter materials light absorbed from the recording light beam produces a local change in the magnetic or electrical polarization of the domains thereby changing the optical polarization properties of a readout light beam reflected by or transmitted through the recording medium.

Alternatively the domains may be composed of a material which does not exhibit the characteristic of reversibility. Such materials include, bismuth, indium, lead, rhodium and tin. In the case of such materials irreversible recording can occur by changes in the size or shape of the domains as well as rupture of the layer.

The matrix may be composed of a dielectric material such as an oxide or silicon, aluminum, titanium or magnesium. The role of the dielectric material comprising the matrix surrounding the domains is to inhibit the formation of an irreversible deformation, such as an opening in the domain or a local change in the shape of the domains. The result of this inhibiting effect is to increase the range of recording light beam powers to which the material in the domains can be exposed and which produce a reversible change in the optical properties of the domains. The utility of a granular material lies in the fact that a domain whose optical properties are changed is surrounded on all sides by a material which inhibits the formation of an irreversible deformation, such as a pit, of the material in the domain.

In prior art recording media, such as those disclosed by Spong and by Bell, a pit is formed in the absorptive layer typically by a local melting of this layer with a subsequent pulling back of a portion of the melted material because of surface tension forces, leaving a pit surrounded by a rim which contains the material from the pit. Consideration of the balance between the surface energy of a melted pool of material and the surface energies of a pit and surrounding rim show that the pit can be formed only if the diameter of the melted pool of material is greater than a certain size. If the diameter of the melted pool is smaller than this critical size, the pit cannot form. Thus, if the dimensions of the domain are kept below the critical size for the formation of the pit, the likelihood that an irreversible change in the absorptive material will occur, is further reduced. Typically the dimensions of such a domain are less than about 100 nanometers and preferably are between about 2 and about 30 nanometers. It is also preferrable that the domain size be less than about 10% of the diameter of the focussed light beam so that fluctuations in the number of domains within the altered region do not lead to a significant noise source on readout.

The absorptive layer, comprising the domains and the surrounding matrix, may be deposited by co-evaporation or co-sputtering of the constituent elements of the domains and matrix. Preferably, the layer is deposited by co-sputtering from a target containing the desired proportions of the elements using techniques such as those disclosed, for example, by Pinch et al in U.S. Pat. No. 4,010,312 issued Mar. 1, 1977 and entitled "HIGH RESISTANCE CERMENT FILM AND METHOD OF MAKING THE SAME", which is incorporated herein by reference. The volume fraction occupied by the domains is determined by the composition of the target and the sputtering geometry. Factors which determine the dimensions of an individual domain include the volume fraction occupied by the domains and the temperature of the substrate upon which the absorptive layer is deposited. The lower the temperature of the substrate the smaller the particles formed for a given volume fraction occupied by the domains.

For the monolayer structure of FIG. 1 the thickness of the absorptive layer 16 is chosen to provide a balance between absorption and reflection of the recording and readout light beams. In the bilayer structure of FIG. 2 the thickness of the absorptive layer 16 is so related to the optical constants of the reflective and absorptive layers that the reflectivity at the recording wavelength is reduced and is preferably minimized. In the trilayer structure of FIG. 3 the thickness of the absorptive layer 16 is so related to the thickness of the spacer layer 42 and the optical constants of the reflective, spacer and absorptive layers, that the reflectivity of the recording medium at the recording wavelength is reduced and is preferably minimized.

One of ordinary skill will recognize that other thicknesses may be used. For example, the thicknesses of the layers could be chosen such that a given change in the optical properties of the recording medium produces the maximum change in the reflectivity of the recording medium.

The reflective layer 32 preferably reflects a substantial fraction, at least fifty percent, of the incident light at the recording and readout wavelength and is typically formed of a metal such as aluminum or gold which has a high reflectivity at these wavelengths. The reflective layer 32, which is typically about 30 to 80 nanometers thick, may be deposited on the surface of the substrate 12 or on the surface of the subbing layer 14 using vacuum evaporation techniques. Alternatively, a single or multi-layer dielectric reflector may be used.

The spacer layer 42 is substantially transparent at the wavelengths of the recording and readout light beams and is formed of a material such as an oxide of silicon, titanium or aluminum. These materials may be deposited using electron beam evaporation techniques. Alternatively, organic materials which can form a smooth coating substantially free of defects may also be used. These latter materials may be deposited on the reflective layer by evaporation, spin coating or glow discharge deposition.

The overcoat layer 22, preferably between about 0.05 and about 1 millimeter thick, may be applied to the absorptive layer 16 to eliminate or reduce signal defects caused by surface dust which precipitates from the environment onto the recording medium. A useful material for this application is a silicone, acrylic or epoxy resin. If an overcoat layer is present then the optical constants of the overcoat layer must also be taken into consideration to determine the optimum thicknesses of the reflective, spacer and absorptive layers.

Figure 4:
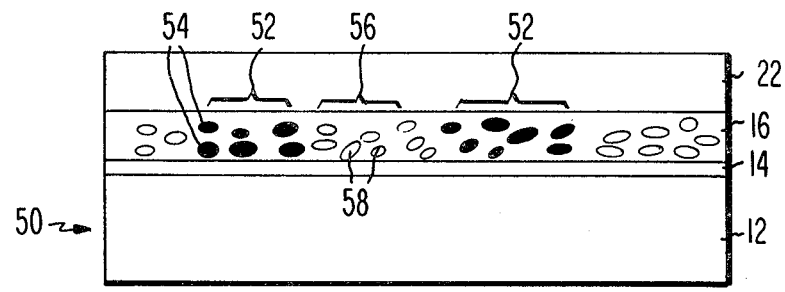
FIGS. 4, 5 and 6 are cross-sectional views of information records of the invention corresponding to FIGS. 1-3 respectively.
Figure 5:
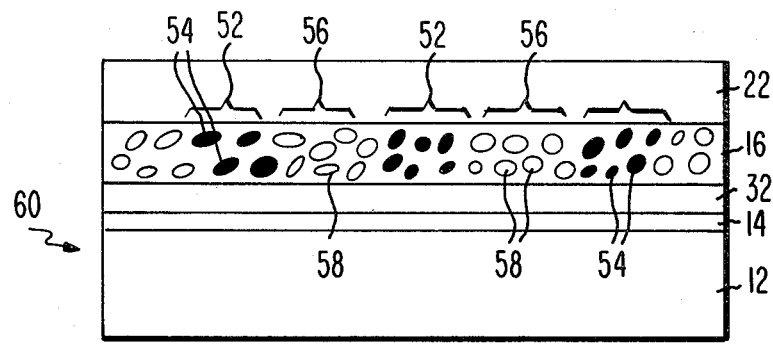
Figure 6:
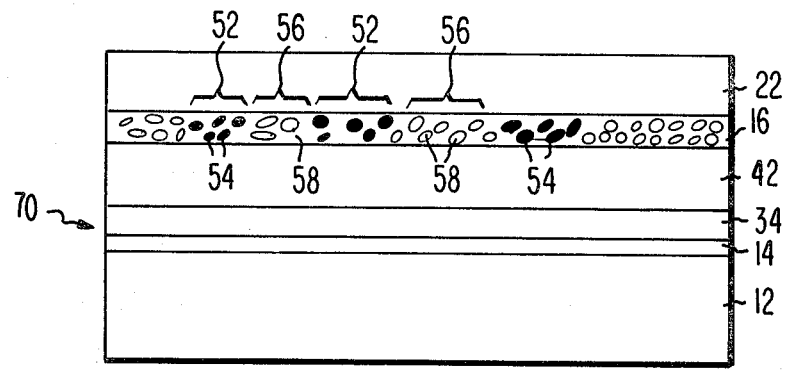

An information track may be formed in the recording medium using apparatus disclosed by Spong et al, referred to above, by exposing the recording medium described herein to a modulated recording light beam of sufficient intensity and time duration to change the optical properties of the absorptive layer. Referring to FIGS. 4, 5 and 6, the identification of the component layers of the information records 50, 60 and 70 is the same as that of the recording medium shown in FIGS. 1, 2 and 3 respectively. In each case information is recorded in the form of a track in the absorptive layer 16 which comprises a series of regions 52 each composed of one or more domains 54 whose optical properties at the readout wavelength have been reversibly switched from their original state to a second state and a series of regions 56, each composed of one or more domains 58 which have different optical properties from those of the domains 54. The information may be encoded as variations in either or both the length and spacing of the regions so switched. The variations in the transmissivity or reflectivity are detected optically and converted into an electrical signal representative of the recorded information.

I claim:

1. In a recording medium comprising a substrate and a light absorptive layer which overlies the substrate and which is absorptive of light at the recording light beam wavelength, the improvement wherein said absorptive layer comprises one or more domains of a light absorbing material, which can be reversibly switched from a first state to a second state having different optical properties, embedded in a matrix of a material effective for inhibiting an irreversible change in the optical properties of the light absorbing material.

2. In an information record comprising a substrate and a light absorptive layer which overlies the substrate, which is absorptive of light at the recording light beam wavelength and which has an information track therein, the improvement wherein said absorptive layer comprises one or more domains of a light absorbing material, which can be reversibly switched from a first state to a second state having different optical properties, embedded in a matrix of a material effective for inhibiting an irreversible change in the optical properties of the light absorbing material and wherein the information track comprises a series of regions in the absorptive layer wherein the light absorbing material comprising domains has been reversibly switched to a state having different optical properties from the remaining regions of the absorptive layer.

3. The article according to claim 1 or 2 wherein the second state has a different degree of crystallinity from that of the original state.

4. The article according to claim 1 or 2 wherein a light reflective layer is interposed between the absorptive layer and the substrate.

5. The article according to claim 4 wherein the thickness of the absorptive layer is so related to the optical constants of the reflective and absorptive layers that the reflectivity of the optical recording medium is reduced.

6. The article according to claim 4 wherein a spacer layer is interposed between the reflective layer and the absorptive layer.

7. The article according to claim 6 wherein the thickness of the absorptive layer is so related to the thickness of the spacer layer and the optical constants of the reflective, spacer and absorptive layers that the reflectivity of the optical recording medium is reduced.

8. The article according to claim 6 wherein the spacer layer is comprised of a material selected from the group consisting of oxides of silicon, aluminum, magnesium and titanium.

9. The article according to claim 1 or 2 wherein the domains are comprised of a material selected from the group consisting of tellurium, selenium, alloys containing tellurium or selenium, chalcogenide alloys, arsenic trisulfide and arsenic triselenide.

10. The article according to claim 1 or 2 wherein the matrix is composed of a material selected from the group consisting of an oxide of silicon, aluminum, titanium and magnesium.

11. The article according to claim 1 or 2 wherein an overcoat layer overlies the absorptive layer.

12. The article according to claim 1 or 2 wherein the dimensions of a domain are less than about 100 nanometers.

13. The article according to claim 12 wherein the dimensions of a domain are between about 2 and about 30 nanometers.

* * * * *